US007569244B2

(12) United States Patent
Jordan

(10) Patent No.: US 7,569,244 B2
(45) Date of Patent: Aug. 4, 2009

(54) READY-TO-EAT DRY FRUIT PRODUCTS AND PROCESS

(75) Inventor: J. Kirk Jordan, 213 Dewberry Dr., Lake Jackson, TX (US) 77566

(73) Assignee: J. Kirk Jordan, Lake Jackson, TX (US)

( * ) Notice: Subject to any disclaimer, the term of this patent is extended or adjusted under 35 U.S.C. 154(b) by 575 days.

(21) Appl. No.: 11/400,460

(22) Filed: Apr. 7, 2006

(65) Prior Publication Data
US 2006/0286270 A1 Dec. 21, 2006

Related U.S. Application Data

(60) Provisional application No. 60/669,703, filed on Apr. 8, 2005.

(51) Int. Cl.
*A23L 1/212* (2006.01)
(52) U.S. Cl. .................. 426/615; 426/443; 426/445; 426/464; 426/516; 426/518; 426/519; 426/640
(58) Field of Classification Search ............... 426/615, 426/629, 640, 443, 445, 464, 516, 518, 519, 426/74, 620, 639, 658
See application file for complete search history.

(56) References Cited

U.S. PATENT DOCUMENTS

| | | | | |
|---|---|---|---|---|
| 3,970,761 | A | | 7/1976 | Wenger et al. |
| 4,038,433 | A | * | 7/1977 | Manser et al. ............... 426/615 |
| 5,718,931 | A | * | 2/1998 | Walter et al. ................. 426/102 |
| 6,027,758 | A | * | 2/2000 | McHugh et al. ............. 426/615 |
| 2004/0022901 | A1 | | 2/2004 | Funk |

OTHER PUBLICATIONS

Treetop Ingredient Division—Evaporated Apples.
Evaporated Apples—Invertect Foods—Product Data Sheet www.sacarlson.com/invertecevapples.htm, Apr. 4, 2006.
Van Zulichem, et al.—Extrusion-cooking Technology for the Confectionary Industry, Dept. of Food Technology, Wageningen, NL Nov. 19, 2004.
Seedburo—RO-Tap Testing Sieve Shaker, www.seeburo.com.
"Extruder Screw Design", Processing Polystyrene Resins, Styrene Asia Limited, www.dow.com/sal/process/ext/ext3.htm, (1995-2005).
The History of Ocean Spray Cranberries, Inc., (1960).
Cooking Extrusion, www.designstudio.mae.cornell.edu/realization/cereal-module/3-cooking-extrusion,html, Dec. 1, 2004.

* cited by examiner

*Primary Examiner*—Helen F Pratt
(74) *Attorney, Agent, or Firm*—Locke Lord Bissell & Liddell LLP

(57) ABSTRACT

The present disclosure provides ready-to-eat (RTE), shelf-stable processed foods composed of up to 100% fruit and the system and process for their manufacture. The product, system, and process uses dried fruit in some form as an in-feed material, having a higher moisture content than heretofore has been suitable for extruder in-feed ingredients, thus retaining at least a portion of the natural volatile materials that contribute to taste and aromas. Further, the dried fruit is extruded and can be dried into crispy, crunchy, chewy, or hard particles or pieces high in fruit content that heretofore have been unavailable, and the products and process can be independent of starch and grain based prior technology. The products of the present disclosure can be eaten as healthy snacks or used as high-fruit-content additives in RTE cereals, baking mixes, toppings, and other food products. The process provides a high degree of efficiency and reduced costs.

25 Claims, 2 Drawing Sheets

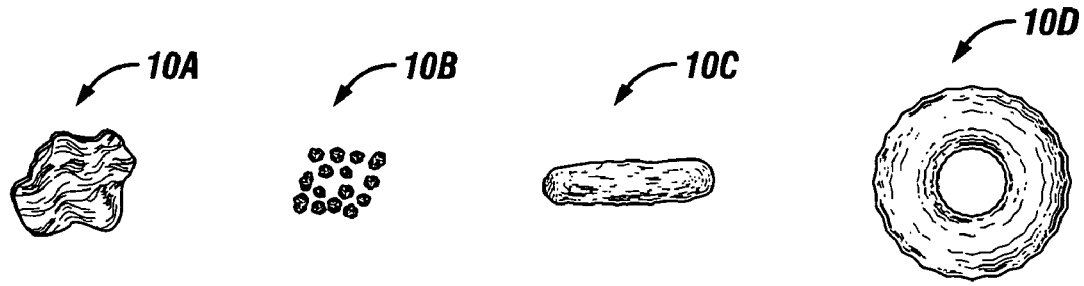
FIG. 1A  FIG. 1B  FIG. 1C  FIG. 1D
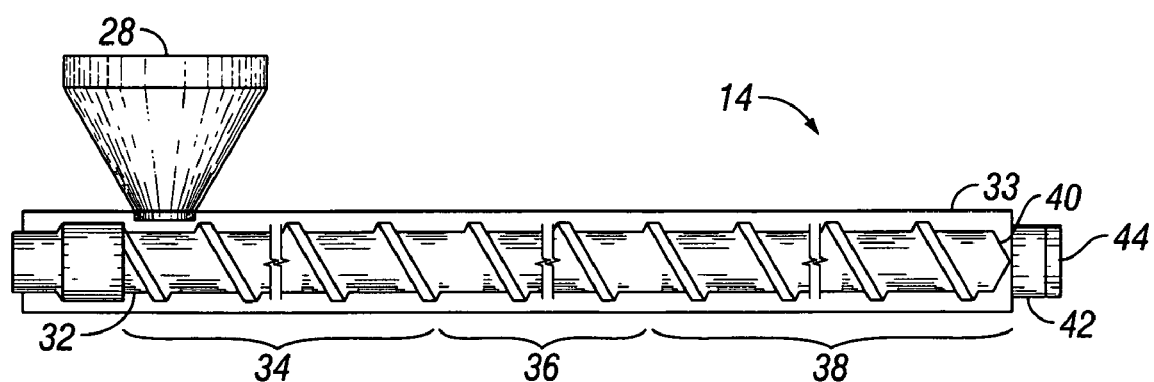
FIG. 3

READY-TO-EAT DRY FRUIT PRODUCTS AND PROCESS

This application claims the benefit of U.S. Provisional Application No. 60/669,703 filed Apr. 8, 2005.

FIELD

The invention relates to food products and food processing. More specifically, the invention relates to high fruit content ready-to-eat foods and a process of manufacture.

BACKGROUND

Since Adam and Eve, fruit has been universally recognized as a highly desirable food. Further, the need for consuming significant quantities of fruit for nutritional purposes is well documented. One reason the public does not consume the recommended quantities of fresh fruit is spoilage; fruit is highly perishable. Thus, the fruit is typically processed to extend its life by canning, freezing or by various evaporative approaches such as sun drying (raisins), hot air drying (dried fruit), freeze drying (blueberries for dry cereal), frying (sliced bananas), spray drying (fruit powders) and dehydration to very low moistures (for dry cereals). Each of these processes has its strengths and weaknesses:

Sun drying in the desert works well in California apricots but not in Washington apples, Michigan cherries or Florida tomatoes;

Hot-air drying makes soft fruit lacking the crispness of fresh fruit and can yield to mold and yeast spoilage over time;

Freeze drying is an elegant way to dry fruit, but it is very expensive (an order of magnitude greater than fresh fruit weight-for-weight), limiting it to high-margin products or small percentages in foods;

Frying imparts fat, offsetting the nutritional value and flavor of fruit;

Spray drying of fruit, limited mostly to pulp-free juices, requires a carrier, such as maltodextrin, that limits the fruit content.

Dehydration to moisture less than 3% depletes volatile flavors and makes a crispy but hygroscopic fruit that rapidly absorbs humidity and can become tough and hard.

The potential for providing other types of fruit products is limited by the processing difficulties associated with fruit compared to other food products. For example, extrusion technology is employed extensively throughout the grain processing industry (but not in fruit processing) to cook grain-based and soy foods because the process is energy efficient, reliable, and sanitary. Major industry segments utilizing extrusion cooking include ready-to-eat cereals, snacks, pet foods, industrial pre-gelled flours, and many others.

A cooking extruder is typically a screw machine that accepts free-flowing grain meal or flour as in-feed material into a progressively reducing, spiral-screw cavity. As the material progresses along the screw or multiple screws of the extruder, the in-feed material is hydrated by water injection (for example, from a 10-12% in-feed moisture to a 15-30% dough moisture), and the moistened material is compressed and heated by friction to "pressure cook" the extrusion dough with the moisture encapsulated as steam. Typically, extrusion in-feed materials must be uniformly free flowing and finely granular, both hallmarks of milled grains such as corn meal, wheat and rice flours, etc. By contrast, fruit products (i) are not as free flowing, causing stoppage of the in-feed material (except in forms too liquid for extrusion cooking), (ii) are often heterogeneous in particle size or granulation, and (iii) are hygroscopic when dried. These characteristics during the 55-year history of food extrusion processing have virtually eliminated extrusion cooking from consideration when processing fruit.

Starches, flours and meals milled from grain have traditionally been used by those skilled in the art of extrusion to manipulate texture and density of cereal foods, such as ready-to-eat breakfast cereals; snacks, such as corn puffs and onion rings; pet foods, such as kibbled dog foods; and many other foods. Starches are long-chain carbohydrates that, when gelatinized by extrusion cooking, form films capable of trapping gas (air and steam) in thin-walled, honey-comb-like structures, aerating the product ("puffing") and reducing the density. In traditional practice, fruit powders have been added in low percentages (for example, Kellogg'® Apple Jacks®) to impart fruit flavor, color or marketing sizzle to starch-based puffed foods.

Some limited attempts to use extrusion technology for fruit have met with mixed results. Typically, the fruit content is severely limited, and in some cases eliminated, so that the technology is virtually identical to the extrusion cooking of grain without fruit. In such cases, the principal ingredients are starches, sugars, gels, gums, flavors and colors, with a small percent of dried or powdered fruit.

The technology for producing high fruit content food products by extrusion is limited. For example, a recent application of extrusion technology to fruit processing has copied starch and grain-based extrusion practices associated with the in-feed material metered into the extruder. U.S. Pat. No. 6,027,758 describes a traditional use of starches that are added as gelling agents to control density and texture of extruded foods, including those composed largely of fruit, the apparent focus of this reference. In a number of pre-extrusion steps, this reference first drum dries the starting material, fruit puree, down to 6% moisture, creating fruit flakes or coarse granules; then grinds the dried fruit solids to a powder form intended for homogeneous, steady metering into the feed section of an extruder; and finally adds water or other liquids back into the barrel of the extruder to facilitate cooking and to prevent mechanical seizure of the extrusion screw. The approach applies traditional grain extrusion practices (drying the in-feed to low moisture, grinding to uniform granulation, and then rehydrating in the extrusion barrel) to a fruit starting material, fruit puree.

In one portion, the reference describes an effect of heat on gelatinization that is well known in extrusion technology and in most other food processing applications in which carbohydrates are cooked. Starch gelatinization occurs under conditions combining water with a temperature of at least 160° F., usually with moderate shear. When processing below the gelatinization temperature, the starch in the reference's fruit product is predictably ungelatinized and the product is dense. As the fruit product exits the extruder, the texture is soft and chewy, like the gels of the reference having a water activity level of at least 0.58. At higher temperatures, gelatinization of the starch occurs by the well-known mechanism, forming a film capable of trapping air and steam. Further, the reference makes no mention of drying technology or equipment to achieve low moisture levels after extrusion, and the reference presents data describing finished products in the moisture range of 19-25%, over three times the upper range for crisp starch products. The products of the reference are high or intermediate moisture gels similar to those used in popular breakfast bars such as Pop Tarts and the like or those with starch content to produce different textures.

A problem with this reference that may preclude it offering a commercially viable approach is that, unlike grain flours or meals, the dried-and-ground fruit powder is hygroscopic, such that it remains free flowing and non-tacky only for a short while, and tends over time to build up on the sidewalls of the handling equipment, most notably in the moist feed section of the extruder, inhibiting sanitary and efficient processing. Such hygroscopic in-feed materials require specialized handling in a commercial production setting and are avoided when possible. To illustrate how industry deals with the hygroscopic nature of fruit powders, they are typically packed only in small quantities in multilayer laminate film pouches that include aluminum foil or Mylar or some other absolute vapor barrier that prevents atmospheric humidity from creating hygroscopic caking of the fruit powder prior to use. Thus, the simple application of a starch and grain-based extrusion technology to the manufacture of products with a high fruit percentage is not readily suitable for commercial production.

In another example of extrusion technology, U.S. Pat. Application No. 20040022901 admixes specially processed crisped rice that has been manufactured in a traditional application of extrusion technology for the cooking of rice flour with a non-extruded fruit product. In this case, only the grain fraction, i.e., the rice flour, is extrusion processed, while the fruit is simply admixed with the extruded crisped rice.

These problems and the attempted solutions using starch and grain-based extrusion principles illustrate the need for a new product, system, and process for high percentage fruit processing with extrusion technology that significantly departs from prior teachings. Thus, there remains a need for high-fruit-content foods produced by extrusion technology from commercially available fruit ingredients that can be handled practically in typical food plant equipment.

SUMMARY OF THE INVENTION

The present disclosure provides ready-to-eat (RTE), shelf-stable processed foods composed of up to 100% fruit and the system and process for their manufacture. The product, system, and process use dried fruit in some form as an in-feed material, having a higher moisture content than heretofore has been suitable for extruder in-feed ingredients, thus retaining at least a portion of the natural juices that contribute to taste and aromas. Further, the dried fruit is extruded and dried into crispy, crunchy, chewy, or hard particles or pieces high in fruit content than heretofore have been unavailable, and the products and process can be independent of starch and grain based prior technology. The products of the present disclosure can be eaten as healthy snacks or used as high-fruit-content additions in RTE cereals, baking mixes, toppings, and other food products. The process provides a high degree of efficiency and reduced costs to make a significant improvement in the art.

The disclosure generally provides, in at least one embodiment, a process for producing a ready-to-eat (RTE) food product, comprising: cutter-milling dried fruit into milled pieces smaller than the dried fruit prior to the milling; feeding the milled dried fruit pieces as an in-feed material into an extruder; compressing the dried fruit to generate heat; and extruding the fruit material to a fruit extrudate.

The disclosure can also provide a process for producing a ready-to-eat (RTE) food product, comprising: obtaining an in-feed material comprising dried fruit grinds and having a moisture content of 13-30%; feeding the in-feed material into an extruder; compressing the dried fruit to generate heat; and extruding the fruit material to a fruit extrudate.

The disclosure can further provide a ready-to-eat (RTE) food product, comprising a crispy extruded fruit product of 100% fruit using a food extruder and having a lower density after extrusion compared to a fruit dough internal to the extruder. The disclosure can further provide a ready-to-eat (RTE) food product, comprising an extruded fruit product using dried fruit as an in-feed material with a moisture content of 13-30% provided to a food processing extruder.

The disclosure also provides, in at least one embodiment, a system for preparing a ready-to-eat (RTE) food product, comprising: a dried fruit supply; a cutter mill coupled to the dried fruit supply; and a food processing extruder coupled to the cutter mill.

BRIEF DESCRIPTION OF THE DRAWINGS

A more particular description, briefly summarized above, may be had by reference to the embodiments illustrated in the appended drawings, forming part of the present specification and described herein. It is to be noted, however, that the appended drawings illustrate only some embodiments described herein and are therefore not to be considered limiting of the disclosure's scope, in that there can be other equally effective embodiments.

FIGS. 1A-D illustrates four non-limiting forms of high fruit content food products that can be produced according to the present disclosure.

FIG. 3 is a cross-sectional schematic diagram of an exemplary food processing extruder.

DETAILED DESCRIPTION

Figure 2:
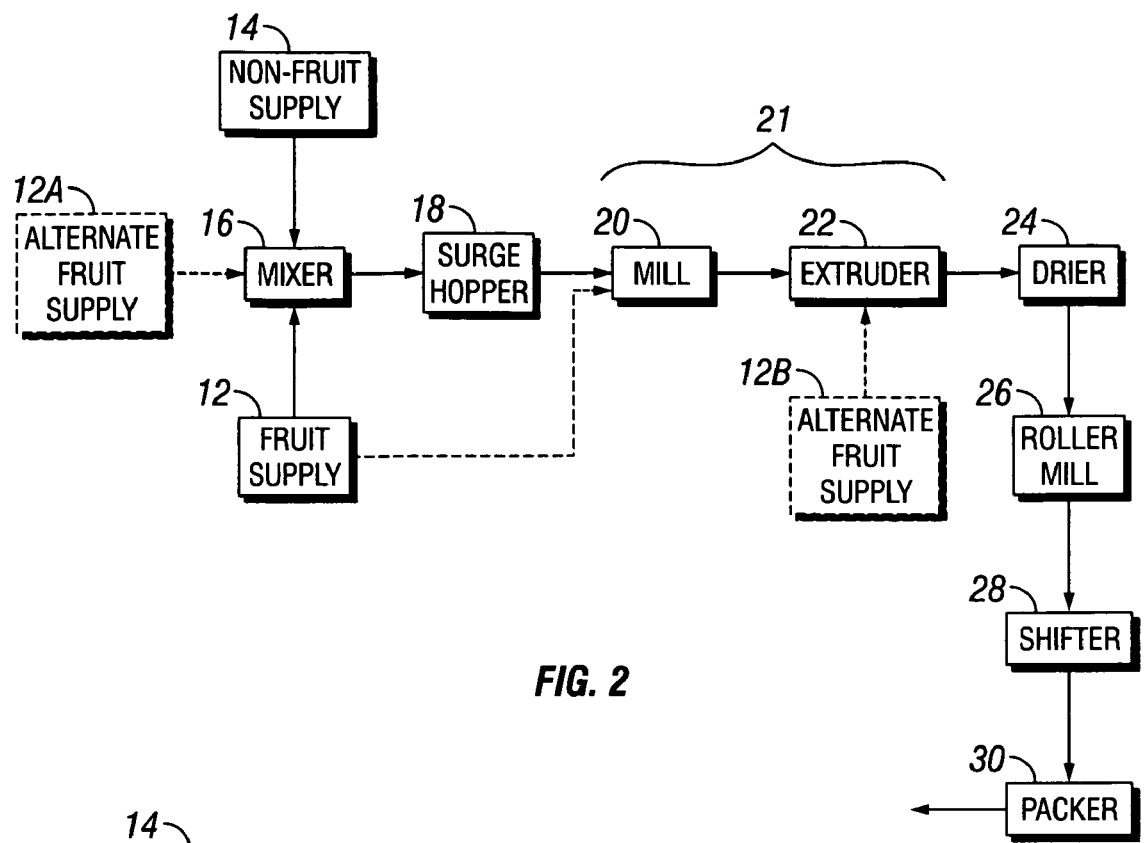
FIG. 2 is a schematic diagram of an exemplary embodiment of a system to produce the high fruit content food products.

The present disclosure provides a solution to heretofore conflicting interests of providing a high percentage of fruit in-feed material for a food extruder while avoiding the hygroscopic in-feed fruit materials of prior efforts. The present disclosure avoids the hygroscopic challenges by providing a "wetter" in-feed fruit material more suitable to an extrusion process, while still providing the fruit materials in a form that is appropriate to the extrusion process. The product and process advantageously circumvent the requirements of drying, grinding to powder, and rehydrating a fruit in-feed material prior to extrusion, while alleviating the special handling problems associated with a hygroscopic fruit in-feed, typified in dried fruit powder.

The disclosure includes a product, system, and process. More broadly, the disclosure comprises a family of nutritious fruit foods and a manufacturing system and process composed of a series of specific processing steps necessary to make the fruit foods. The fruit foods may be composed 100% of a single fruit ingredient; or the fruit foods may be composed 100% of a combination of several fruit ingredients; or the fruit foods may be composed of fruit ingredients co-processed with other non-fruit food ingredients, such that fruit ingredients comprise at least one-third (33%) by weight of all the ingredients, advantageously at least 75%, and more advantageously at least 90%. The manufacturing process is a series of sequential steps in which dried fruit or dried fruit with other ingredients are mixed, homogenized, extruded, dried, sized, and packaged.

The disclosure includes (1) a new category of fruit foods; and (2) a practical system and method of manufacturing these processed fruit foods. The disclosure provides, first, a new category of unique food products composed mostly of fruit (up to 100%) and other food ingredients and fashioned in various dry or semi-moist physical forms; and second, a system and process to manufacture the various fruit products by orderly execution of the processing steps that transform the dried fruit and other starting ingredients into the finished processed fruit food. The products of the invention can be variously described as a crispy, crunchy, chewy or hard RTE, shelf-stable foods composed totally or mostly of fruit. The process of the invention can be described as a series of sequential processing events, including a steady presentation of the homogeneous ingredient(s) to a high pressure/high temperature extrusion processor, followed by drying with heat, milling and sifting for sizing, and packaging in a vapor barrier to prevent the hygroscopic absorption of moisture from the ambient air into the food product.

For the purpose of the present disclosure, the following terms and their meanings can assist in understanding the disclosure. The term "product moisture" includes the weight of water in the product relative to the weight of dry material, expressed as a percent. The moisture content is usually determined by weighing a sample, then desiccating it under vacuum and heat, and re-weighing the sample to ascertain the moisture loss in accordance with a standardized procedure by the Association of Official Analytical Chemist (AOAC) 934.06 for dried fruit. The term "water activity" ("Aw") is related directly but non-linearly to moisture and can be practically thought of as the relative humidity inside a product. "Aw" measures the vapor pressure of the moisture in a hygroscopic material at a specific temperature, expressed as follows:

$$Aw = p/ps \text{ and } \% \text{ humidity} = 100 \, (Aw) \text{ where:}$$

p=the partial pressure of water vapor of the product, and ps=the partial pressure (saturation) of water vapor of pure water.

In foods, water activity is most often used as an expression of the moisture available to support microbiological growth. Most bacteria require an Aw of at least 0.91 and most molds require at least 0.80, although a few osmophilic microorganisms can live as low as 0.60.

The term "hygroscopic" characterizes dry materials that tend to absorb water, usually from air. Desiccants are hygroscopic materials intended to absorb moisture from a product in a confined space, thus keeping the product dry while raising the moisture level of the desiccant. Foods that are hygroscopic tend to absorb humidity from air or to redistribute moisture in heterogeneous foods, e.g., sun-dried raisins transferring moisture to hygroscopic bran flakes, resulting in hard raisins and stale bran flakes.

A "gel" is a semi-rigid solid mass, a colloidal suspension composed of a liquid phase and a solid phase in which the liquid molecules have been absorbed in the solid molecules.

FIGS. 1A-D illustrate four non-limiting forms of high-fruit-content food products that can be produced according to the present disclosure and will be described in conjunction with each other. The shapes, textures, and physical properties can vary and the following is merely exemplary. For example, a fruit product 10A can be formed of the present invention as a chip or flake with a crunchy or crispy texture. Heretofore, a disk or slice of fruit in this shape would be leathery and hard to chew, giving less pleasure and motivation to ingest. A second exemplary fruit product 10B can be a granular food product of various granulations: from fine granules, such as a granular sweetener composed of sweet fruit, such as a Fuji apples, sprinkled on other foods; to larger granules, such as a breakfast nuggets served in a bowl with milk, mimicking the appearance and texture of Post® brand Grape-Nuts® cereal (which, despite its name, is composed of barley and not grapes); to larger amorphous lumps, as would be suitable for a hand snack or finger food. The texture can vary and in general the high fruit product can be crispy or crunchy to add to its appeal as a food, although in some embodiments it could be soft and chewy or hard like candy. The term "crispy" is exemplified by Cheetos® cheese puffs, potato chips, and crisped rice, and defined as firm but easily broken or crumbled. For the purposes herein, the term "crunchy" is exemplified by foods such as Post® brand Grape-Nuts® cereal, granola clusters, and croutons. The term "hard" is exemplified by hard candy, such as LifeSavers® candies, peanut brittle, and crushed ice. The term "chewy" is exemplified by taffy candy, Nabisco® Fig Newtons®, and Tootsie Roll® brand chocolate candy.

A third exemplary fruit product 10C could be a puffed fruit product similar to shape and size of Cheetos® cheese puffs. The shape could vary from spherical to cylindrical. A fourth exemplary fruit product 10D could be a donut-shaped product of various sizes from a dime-size or smaller to a larger donut-sized disk or other sizes as could be suitable to the marketplace.

Fruit products of the disclosure that are composed of 100% fruit may be formulated from a single fruit (e.g., dried apple); or from blends combining a single fruit with a fruit fraction of that same fruit (e.g., dried apple and dried apple pulp); or from one or more fruits combined with fractions of a different fruit (e.g., dried apricot and dried apple and optionally combined with a dried fruit pulp). In addition to formulations processed entirely from dried fruit pieces (e.g., dried apple pieces) or entirely from dried fruit grinds (e.g., dried apple grinds), or from a combination of dried fruit pieces and dried fruit grinds, other formulations that include edible fruit fractions (e.g., dried apple pulp or dried apple juice powder or dried apple puree powder) may be created to make a processed food product that is 100% fruit. These combinations of dried fruits and dried fruit fractions may be incorporated into a formulation to achieve certain functional properties, such as enhanced fruit fiber content, enhanced flavor or color levels, cost containment, and so forth. In at least one embodiment, a fruit food product can be made from 100% fruit composed of a single dried fruit or of blends of various dried fruits or of blends of dried fruits and dried fruit fractions in their various physical forms.

The term "dried fruit grinds" as a subset of dried fruit is intended to include the homogenized fruit tissue from dried fruit, with or without the fruit peel and tiny seeds depending on the fruit, and minus the stems, pits and large seeds to the extent technologically possible. The term "dried fruit pulp" is intended to indicate the fruit fraction remaining after fruit juice is pressed from the fruit, and the residual fruit solids are dried to a powder with a moisture content of approximately 5%. The term "dried fruit powder" is intended to include the dried fruit solids derived from fruit puree or fruit juice ground and sifted to a fine powder with moisture less than 3.5%.

Other fruit products of the invention may contain less than 100% fruit, i.e., formulations composed of (1) dried fruit or combinations of various kinds of dried fruit or dried fruit fractions in their various physical forms as the primary in-feed ingredient(s), and of (2) one or more non-fruit ingredients. The various non-fruit ingredients may be dry blended with the dried fruit prior to extrusion and processed as a homogeneous fruit-and-non-fruit mixture to achieve certain product characteristics, such as sweetness levels, textural effects, color intensities, aromas, and other features. A partial list of these functional non-fruit ingredients includes: dry or liquid sweeteners (e.g., fine granular sugar), texture stabilizers (e.g., wheat starch or rice flour), nutrition enhancers (e.g., proteins, vitamins, minerals), colors, flavors, and other food-grade ingredients and food additives. For example, a fruit food product can be composed of (1) fruit and/or fruit fractions in sufficient quantity that the sum of the fruit components equals at least one-third of the fruit product.

In this disclosure, one starting material is food-grade dried pieces of intact fruit tissue known as "dried fruit" or "evaporated fruit", such as, for example, dried apple or dried apricot. Dried fruit is an industrial and retail ingredient readily available in various physical forms and specifications in the world market place. The fruit is dried after harvest to a moisture level consistent with preservation for at least a year when stored in a dry warehouse at temperate or cool storage temperatures. The actual moisture level in dried fruit depends on the individual fruit, the level of soluble solids in the fruit, the presence or absence of added chemical or osmotic preservatives, and other factors. However, in general, dried fruit has a moisture range between 13 and 30%. Post-harvest fruit dehydration functions as a physical preservative to strongly inhibit further ripening and degradative growth of microorganisms, especially yeasts and molds. In the market place, dried fruit is variously offered with or without sulfur dioxide ($SO_2$), a food additive that assures flavor and color retention in the dried fruit and that is largely dissipated by the processing of this invention. Such dissipation through the processing of this disclosure is important because some people can experience allergic respiratory distress when exposed to sulfur dioxide levels above their symptomatic threshold. In the manufacture of these processed products made from up to 100% fruit, the dried fruit is fed directly into the extrusion processor, either into the feed section of the extruder or into a conditioning cylinder before the feed section or into other upstream equipment. In contrast to the prior art, the use of dried fruit eliminates (1) the required extra steps of drying, grinding and sifting of drum-dried fruit puree before extrusion processing, (2) the attendant loss of volatile flavor components associated with drying and grinding, (3) the sanitation and equipment processing challenges associated with handling a highly hygroscopic food ingredient, and (4) the rehydration of the dried puree inside the extruder with added water or other liquids not native to the original fruit.

In at least one embodiment, the dried fruit is finely chopped and divided into a generally continuous homogeneous in-feed material. This step is accomplished by passing the dried fruit through an Urschel™ mill, grinder having a cutter, or other cutter mill. A "cutter mill" and the contextual term "mill" (and corresponding method "cutter-milling") is defined broadly to include any device that can shear and degrade the cellular structure of the dried fruit pieces into finely divided fruit, thus helping insure the extrusion of a homogeneous, fine in-feed material and resulting in a homogeneous output material (extrudate) at the extrusion die. Because some extruders in the extrusion process are inefficient mills, the insertion of a cutter mill to create a homogenized, milled dried fruit as the in-feed material is preferable to feeding evaporated fruit dices or similar small pieces of intact fruit tissue into the extruder in-feed. An additional advantage is that dried fruit of any size or configuration (whole, sliced, or diced) may be used. Use of a cutter mill to feed the extruder yields a homogeneous extrudate which, when dried to a very low moisture, makes a crispy, crunchy, or hard piece, lump or granule of fruit. By contrast, the direct extrusion without comminution of dried fruit pieces, such as dried fruit dices with their cellular matrix intact, can lead to a heterogeneous extrudate containing intact pieces of dried fruit buried in a matrix of partially ground fruit. Such intact pieces of fruit, when dried, produce a tough, resilient or hard piece of fruit having a texture significantly different from that of the crispy, crunchy, or hard fruit matrix of the present disclosure.

Alternatively, it is possible to configure the tooling, such as screws of an extruder with a cutting section to function as a cutter mill, to homogenize the soft structure of dried fruit pieces to create a substantially homogeneous fruit mass inside the initial segments of a long barrel extruder. The cutting section would generally be located in the early stages or barrels of the extruder between the feed screw and the extrusion stages. Thus, the cutter mill becomes integral to the extruder. Such an extruder configuration allows feeding dried fruit dices or pieces directly into a feed throat of the extruder without first passing the dried fruit pieces through a comminuting step prior to entering the extruder. The comminuted fruit mass thus created in the initial extrusion barrels proceeds though the pressurizing and heating segments of the extruder in an extrusion process and through an extrusion die, extruding a puffed or slightly expanded porous fruit product substantially free of intact, distinct, dried-fruit fragments.

Another practical starting material of the invention is industrial dried fruit grinds. In commercially available fruit, such as apple, grinds are manufactured by (1) cleaning, peeling and coring the fruit; (2) drying fruit pieces to a moisture adequately low (approximately 24% moisture for apples) to preserve the fruit in a shelf-stable mode at cool temperatures; and (3) extruding the dehydrated pieces through an orifice (die) in a machine similar to a meat grinder, disrupting the cellular structure of the fruit and creating a somewhat sticky homogeneous fruit pieces. In some fruit grinds such as apricot, the fruit is pitted but not peeled. In other fruit grinds such as raisin, the skin and tiny seeds can be included. Commercial fruit grinds take numerous physical forms, including spaghetti-like strings or fruit paste or fruit paste with finely divided particles (e.g., skin or tiny seeds). In this disclosure, extrusion of 100% fruit grinds results in a uniform, homogenized extrudate that is then dried to a crispy or crunchy RTE fruit food, such as an amorphous lump fruit snack; or fruit granules for admixing into dry foods, such as RTE cereals or granola bars; or fine fruit granules or powders used as fruit sprinkle toppings or fruit flavorings. Utilizing fruit grinds as the starting material avoids: (1) the requirement in prior art of extra drying, grinding, sifting and rehydration of fruit puree to extrude 100% fruit foods, and (2) the requirement to pass the dried fruit starting material through any milling step prior to extrusion.

Still another practical starting material is fruit infused with sweetener, such as sucrose or corn syrups. Some fruits, such as blueberries or cranberries, are available in the market place in the infused form rather than or in addition to the uninfused, dried fruit form.

In some cases, the use of dried pieces of intact fruit tissue (dried fruit) is preferable to fruit grinds as a starting material because fruit pieces are free flowing and are less likely to stick in production equipment. However, dried fruit pieces, with their cellular structure largely intact, require additional comminuting before extrusion to disrupt the cellular structure and to minimize the quantity of individual fruit particles that tend to survive the extrusion process and to exit the die as intact dried fruit particles imbedded in the extrudate matrix. The insertion of a mill into the process line to comminute the dried fruit into finely divided fruit pieces ahead of the extrusion step allows the direct use of dried fruit as a starting ingredient. Especially in the case of fruit products composed 100% of fruit tissue, the advantage of finely divided dried fruit over dried fruit grinds is that the former is free flowing and easier to handle in industrial equipment.

In other cases in which the dried fruit is admixed with other dried fruit ingredients, e.g., apple pieces mixed with apple pulp, the use of apple grinds may be preferable because the grinds become coated with the other dry ingredients in the blending step, making the grinds free flowing in the feeding step while eliminating the need for direct cutter milling.

Figure 2A:
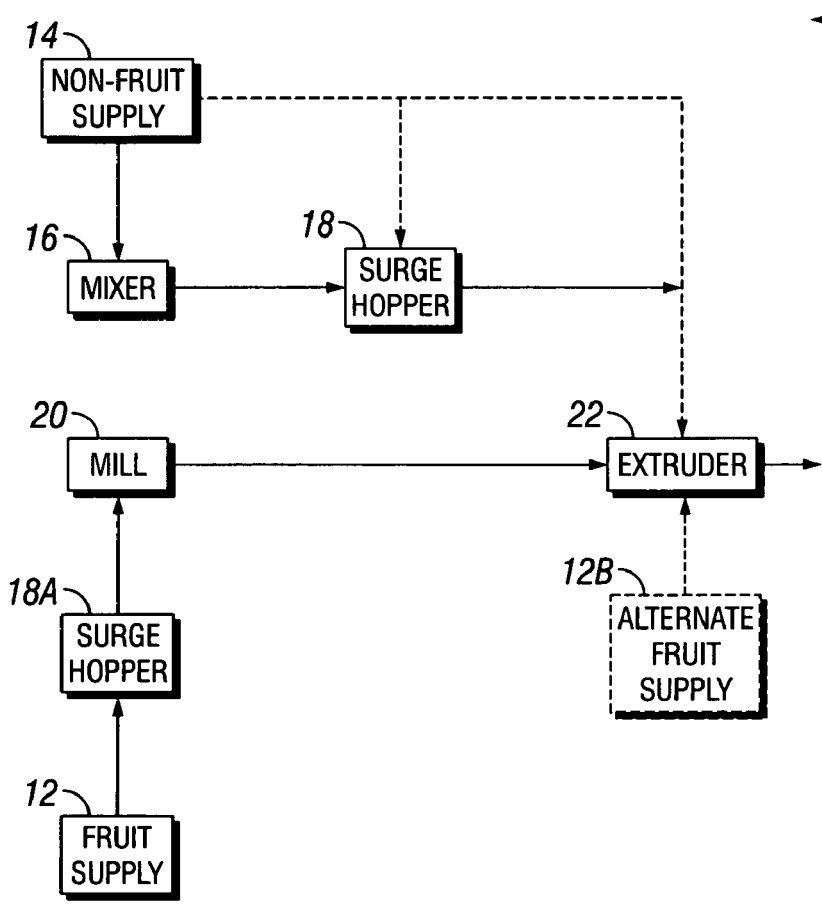
FIG. 2A is a schematic diagram of an alternative of the system shown in FIG. 2.

FIG. 2 is a schematic diagram of an exemplary embodiment of a system and process to produce the high fruit content food products. FIG. 2A is a schematic diagram of an alternative of the system shown in FIG. 2 and will be described in conjunction with FIG. 2. As described herein, different pieces of equipment can be used depending on the starting point of the materials and the desired shape of the finished product. Thus, the exemplary embodiment can be varied and the illustration is not intended to limit alternatives.

The exemplary system 2 represents a production line and includes a fruit supply, an optional non-fruit supply, a mixer depending on the materials, a cutter mill depending on the type of fruit supplied, a surge hopper, an extruder, a drier, a roller mill depending on the shape of the product desired, a sifter depending on the product desired, and an optional packer. Each piece of equipment will be described below.

The fruit supply 12 can include a supply of fruit products as described herein. In at least one embodiment the fruit supply can include dried fruit pieces in various sizes. In some embodiments, the fruit supply 12 can represent a plurality of fruit supplies of different fruit, different sized and shaped pieces, and different types of fruit forms such as fruit grinds and fruit fiber.

The fruit supply 12 can be coupled to a mixer 16. The term "coupled," "coupling," and like terms are used broadly herein and can include any method or device for communicating, attaching, joining, inserting therein, forming thereon or therein, securing, binding, bonding, fastening, or otherwise associating, for example, mechanically, magnetically, electrically, chemically, directly or indirectly with intermediate elements, one or more pieces of members together and can further include integrally forming one functional member with another.

The mixer 16 can be useful if other materials besides a single fruit source are to be used in producing the product. Alternatively, a fruit source that does not need mixer can bypass the mixer and perhaps the surge hopper 18, and proceed to the mill 20, described below. Such other materials can be different fruits or fruit forms, such as grinds or fiber, from the fruit supply 12, or non-fruit materials from a non-fruit supply 14. The mixer 16 can be used to blend the in-feed material to provide a relatively homogeneous mixture in those embodiments where multiple in-feed products (products with a plurality of fruits or products with fruit and non-fruit portions) are used. Without limitation, any general food-grade ribbon blender, paddle mixer, V-blender or other design producing a homogeneous mixture may be employed. In some embodiments, the non-fruit supply 14 can supply materials to be blended with the fruit in the mixer 16. As discussed herein, such non-fruit materials can assist in achieving certain product characteristics, such as sweetness levels, textural effects, color intensities, and so forth.

In at least one embodiment, it can be advantageous to include a surge hopper 18 that can be coupled to the mixer 16, if used. The surge hopper 18 can receive the materials from the mixer to provide a buffer in the production line, so that the mill, if used, and the extruder can receive a substantially continuous flow of material.

The surge hopper 18 can be coupled to the mill 20. In at least one embodiment, the mill 20 can include an Urschel™ mill or similar cutter mill to degrade the cellular structure of the dried fruit pieces into finely divided fruit, thus insuring the extrusion of a homogeneous, fine in-feed material. While the term "mill" is broadly used in the food processing industry and generally includes several types of processing, the type of mill used for processing the in-feed dried fruit in this disclosure is used more distinctly to refer to a cutter mill, as opposed to a grinder or roller mill. A grinder mill used in prior art to mill grain into flour or to reduce very low moisture fruit flakes and granules down to fruit powder would not be suitable for the relatively high moisture content of the dried fruit. The use of a cutter mill for the food processing of fruit has not been provided prior to the present invention to prepare the in-feed material for extruder processing. Urschel mills as exemplary cutter mills are typically used to slice, dice, or homogenize fresh fruit and vegetables, cheeses, meats, nuts and peanuts, and other soft or wet foods that tend to stick to and foul roller, attrition or hammer mills. The various cutting heads of a cutter mill can be selected to produce different size pieces, as desired. The insertion of a cutter mill to create a homogenized, milled dried fruit as the in-feed material is preferable to feeding evaporated fruit dices or similar small pieces of intact fruit tissue into the extruder in-feed because in general extruders are designed to receive rather than to generate homogeneous material for processing. An additional advantage is that dried fruit of any customary size or configuration (whole, sliced, or diced) can be used to feed the mill. Use of a cutter mill to feed the extruder generally yields a substantially homogeneous extrudate.

Alternatively, if a fruit supply, such as fruit grinds, does not require milling, then the mill can be bypassed or removed from the system and a fruit supply 12A can provide the fruit to the mixer, if other materials are to be added to the fruit as in-feed material to the extruder. Further, if the fruit supply does not need milling, such as fruit grinds, and is otherwise a homogeneous supply, for example, composed of a single fruit, then the mill and mixer can be bypassed or removed from the system and a fruit supply 12B can provide the fruit for the in-feed material to the extruder.

The present disclosure starkly contrasts to traditional extrusion processing. To extrude fruit, traditional thinking starts with fruit powder fed into the extruder to create a homogeneous dough. So technologists have desiccated fruit puree to a powder by various drying, milling and sifting technologies, and then added water into the extruder to create a homogeneous dough. The typical approach has adopted traditional extrusion technology in which field grain, e.g., corn, is dried, ground into meal, sifted, and hydrated into a dough inside the extruder. Traditional food extruders have been fed by finely granulated dry flowable starch sources, such as grain flours and meals. The typical approach has adopted such grain-based technology to fruit extrusions by supplying dry fruit powder to an extruder, not large pieces of wet or intermediate moisture ingredients existent in "dried fruits" having a moisture content greater than the fruit powders. This typical approach applied to fruit has been followed even though (1) fruit desiccation to approximately 5% moisture or less as in-feed fruit powder material before extrusion dissipates volatile flavors and aromas and wastes energy; and (2) fruit powders are so hygroscopic that their use as food ingredients is problematic and impractical under typical extrusion processing conditions. Thus, without the current disclosure, innovation in fruit extrusion continues to be anchored in the traditional grain-based approach of drying, grinding to a powder, sifting, supplying to the extruder, and re-hydrating in the extruder. Perhaps the use of dried fruit pieces has been avoided because the extrusion process is generally very ineffective at milling, inefficient at reducing fruit pieces to a homogenous fruit dough, and the resulting heterogeneous extrudate dries to an unpalatable leathery texture similar to that of fruit pieces desiccated to 5% moisture or less without the texturizing benefits of extrusion processing.

In at least one embodiment, this disclosure provides for the relatively "wet" slicing and milling of dried fruit pieces. Cutter-milling is important to break down the fruit pulp to allow formation of a homogeneous extrusion fruit dough. Dried fruit pieces of any size may be metered into the cutter mill equipped with an appropriate fine cutting head, then continuously discharged into the processing line or directly into the feed section of an extruder. Compared to fruit powder, dried fruit pieces receive less drying and milling, thus conserving aroma and flavor volatiles. Dried fruit is easy to handle in processing equipment and is only slightly hygroscopic because its moisture content (13-30%) is much higher than fruit powder at 5% or less.

The mill 20 can be coupled to the extruder 22 to provide the materials therefrom. The extruder 22 is generally a continuous high-temperature/short-time pressure cooker in which, in the presence of moisture, an Archimedes screw mixes and compresses raw material into a fruit dough and generates frictional heat, shear, and pressure to cook the fruit dough. The extruder then can extrude the fruit dough through a restrictive orifice back to atmospheric pressure to form an extrudate with a porous structure.

As described above, the cutter mill 20 and extruder 22 can be combined into an integrated unit 21, such as a long barrel extruder. The cutting section would generally be located in the early barrels of the extruder between the feed screw and the extrusion stages. Such an extruder configuration allows feeding dried fruit dices or pieces directly into a feed throat of the extruder without first passing the dried fruit pieces through a comminuting step prior to entering the extruder. The later stages of the extruder are used in the extrusion process to extrude the fruit mass as described herein.

Referring briefly to FIG. 3, a cross-sectional schematic diagram of an exemplary food processing extruder is shown. An extruder 14 can be a single screw extruder (as illustrated) or a multiple (such as twin) screw extruder. Depending on the application, size, shape, and amount, each type has advantages and disadvantages. Generally, twin-screw technology is more versatile, whereas single screw technology is less expensive. The extruder 14 can have a variable number of sections 33 (also known as "barrels" or "heads") through which an extruder screw 32 rotates. The extruder screw 32 generally has various diameters, pitch, flight depth, and other design criteria to process the in-feed material from the inlet through the outlet. Regardless of the number of heads, in general, the extruder 14 includes an inlet 28 in which the material to be processed is loaded. A first barrel section is termed a "feed" section 34 that accepts the in-feed material into the processing portion of the extruder in conjunction with the extruder screw. The feed section is generally at ambient temperature and pressure. The next section is termed a transition section 36 because the granular or particulate in-feed material is converted to a homogeneous molten fruit dough. The in-feed material is compressed through a change in the screw pitch, diameter, or other design criteria. The transition section 36 operates with an elevated temperature of approximately 30-70° C. (85-160° F.). A next section is termed a cooking section 38 that creates frictional heat, shear, and compression elevating the material to approximately 70-130° C. (160-260° F.). The material is extruded as an extrudate through an outlet 40 and generally through a die 42 to shape the extrudate and cut through a cutter 44 into desired pieces.

To maintain a constant cook, food extruders operate under steady-state conditions, with the quantity of raw material input equal to the product output at any given moment. Consequently, smooth flowability of the raw material, that is, a steady in-feed rate into the grooves of the extruder feed screw, is required for optimum performance. Hygroscopic in-feed materials can create stoppages and inhibit uniform flowability by building up on equipment surfaces, creating breakaway, high-moisture lumps that destabilize or eventually blind the extrusion in-feed.

The solution offered by the present disclosure provides a high percentage of fruit in-feed material while avoiding the hygroscopic in-feed fruit materials of prior efforts. The present disclosure provides a "wetter" in-feed fruit material more suitable for fruit dough formation in an extruder process, while still providing the fruit materials in a form that is appropriate to the extrusion process.

The process offers the following advantages over current technology:

1. 100% fruit or fruit blended with other ingredients may be fed directly into the extruder, greatly simplifying the current technology that requires (a) drying of fruit puree on a flaking roll to 5% moisture level or less (b) grinding and sifting the resulting dried fruit flakes or pieces, reducing them to powder form, and (c) re-hydrating the powder in the extruder.

2. Directly feeding the dried fruit into the extruder via an Urschel mill or the like, or directly feeding fruit grinds greatly simplifies the handling of the fruit because the dried fruit is only slightly hygroscopic, whereas the fruit powder (5% moisture or less) is very hygroscopic, necessitating dehumidified plant air or limited exposure to atmospheric air or special equipment to deal with chronic caking, sloughing and blockage problems associated with hygroscopic ingredients.

3. Dried fruit pieces retain much more of the native fruit juice (13 to 30%) with its flavor and aroma components than dried fruit powder (5%). For processing, dried fruit powder must be re-hydrated in the extruder with water or some other liquid, whereas dried fruit can be extrusion processed using the native fruit juice alone.

Alternatively, as shown in FIG. 2A, the non-fruit supply 14 can provide the non-fruit ingredients, such as flour and sugar, to the mixer 16 for blending. The blended materials can be stored in the surge hopper 18, and metered into an extruder pre-conditioner of the extruder 22. Still further, the non-fruit supply can be directly supplied to the surge hopper 18, for example, if the mixer 16 was unnecessary, or can be fed even directly to the extruder 22. Similarly, the fruit can be fed into a surge hopper 18A, then to the mill 20, and to the extruder 22 from the mill 20.

Returning to FIG. 2, after the extruder 22, the extrudate can be dried to a selected level in a drier 24, such as a hot-air drier, as a prefinished food product. The product exiting the drier can have a moisture content of less than about 10% and advantageously less than about 6%. The water activity can be less than about 0.55 and advantageously less than about 0.3.

In at least one embodiment, the extrudate is hot from the extrusion die and can be distributed evenly onto the belt of a hot-air drier. Another drier that can be used is a fluidized bed drier that passes a gas (usually air) through a product layer under controlled velocity conditions to create a fluidized state of the product and increase exposure to the gas. Yet another drier can be use of a freeze drier with an increased efficiency over conventional freeze-drying of fruit due to the expanded nature and low density of the herein disclosed food product. The product can be discharged from the drier at the desired moisture by varying the temperature and residence time in the drier. Generally, the product texture will be specified to be hard (like hard candy) or crunchy (like Post® brand Grape-Nuts® cereal) or crispy (like corn flakes) or chewy (like taffy), in contrast to higher moisture gelled fruit products that are not dried.

For some products, a mill 26, such as a roller mill or other appropriate milling technology (generally not a cutter mill that shears the products before the extrusion process as referenced above), can be used after the drier to reduce the particle size of the extrudate to the desired range. A sifter 28 can be used to screen the extrudate to certain sizes for ultimate packaging. A packer 30 can package the product in a variety of soft and hard containers, including weather resistant packaging and can further include vacuum or controlled atmosphere processing.

The following process is described as at least an exemplary, non-limiting embodiment, as the disclosure provides for multiple variations and others known to those with ordinary skill in the art, given the disclosure herein: An in-feed material of 100% fruit from single ingredient, dried fruit pieces, is fed into an Urschel™ brand mill fitted with a cutting head fine enough to reduce the dried fruit pieces to comminuted dried fruit pieces, thereby partially disrupting the physical structure of the fruit. The feed rate into the mill is set at a constant speed equal to the output rate of the production line. The mill discharges comminuted dried fruit pieces directly into the feed section of the extrusion processor, which is operated under conditions to create a slight aeration or puffing of the extrudate. The extrudate is continuously fed into a drier, where moisture is reduced as desired below a water activity less than 0.55, and the finished product is sized and packaged.

Alternatively, to manufacture a product of the invention containing 100% fruit composed of more than one dried fruit ingredient, a blending step is inserted before the cutter mill to create a uniform in-feed.

Further, to manufacture a product of the invention containing less than 100% fruit, the ingredients can be blended prior to the extrusion in-feed step. Dried fruit grinds can be used for blends in which the grinds represent 80% or more of the blended formulation because ingredient stratification or segregation by size (density) is not problematic in this range. With dried fruit concentrations between one-third and 80%, blending techniques well known in the art are employed to maintain a homogeneous mixture. Although the percentage of dried fruit can vary in the finished product depending on the desired market, it is contemplated that the product will contain at least one-third fruit, generally at least 40%, advantageously at least 75%, and in some embodiments 100% fruit.

The fruit food product is extruded at elevated pressures (generally 100 to 1500 pounds per square inch at the die) and elevated temperatures (generally from 70° to 130° C. (160-260° F.) at the die) to lower the product density (i.e., to puff the extrudate) below that of the fruit dough material inside the extruder and to greatly increase the total product surface area (both internally and externally) by creating a porous, fine, honey-comb-like internal structure and an expanded overall product volume. This honey-comb structure accomplishes several physical functions, including: (1) facilitating the drying of the extrudate by greatly expanding the product surface area internally and externally, allowing increased hot air contact with the product; (2) creating a honey-comb-like structure having a multitude of thin walls, making the texture of the dried product lighter and crispier to the bite; (3) increasing the product volume for heightened visual impact.

In formulations with less than 100% fruit in which starches or flours are admixed with fruit prior to extrusion, the extrusion processor cooks (gelatinizes) the raw starches, creating a carbohydrate film (matrix) that facilitates the entrapment of steam and air inside the extrudate, thus facilitating greater volume expansion and ultimate textural tenderness of the dried finished fruit product.

An additional advantage of extrusion processing of the input food ingredients (the dried fruit and the non-fruit ingredients) at these elevated pressures and temperatures is high temperature/short time (HTST) pasteurization, which occurs as the fruit food traverses the extruder and exits the die, greatly reducing the microbiologic flora to very low levels for enhanced food safety and storage stability. This food safety margin is especially significant in RTE foods that are consumed directly without an intervening cooking step at the consumer level.

EXAMPLES

The technology disclosed herein is applicable to many different categories of existing or potential fruit products. In general, any application in which a crunchy or crispy fruit texture and flavor are desirable, either standing alone or as an incorporated ingredient, can be manufactured with the disclosed technology. Some typical broad applications include: confectionary, ready-to-eat dry breakfast foods, snacks, bakery applications, sprinkle toppings, and others. Without limitation, below are some examples.

Example 1

Crunchy Apple Candy, 100% Apple

Commercially available sweet-apple dices (approximately 29% natural sugars, Fuji variety) were fed at a continuous rate into an Urschel 1700 Comitrol mill equipped with a fine M-style cutting head to reduce the dices to finely divided apple pulp pieces. These flowed down a chute directly into the feed throat of a 5-head single screw extruder equipped with high-pressure screws, a pressure plate and restrictive die openings to increase the extrusion backpressure. No liquids were added; the native apple juice in the dried apples having 26% residual moisture provided adequate moisture for extrusion processing. From in-feed to exit die, the temperatures in the extrusion heads steadily increased from room temperature in the feed section to 130° C. (266° F.) at the die. The extrudate was sliced at the die face into amorphous lumps approximately 1 cm diameter and was conveyed to a forced-air, continuous-tray drier at 82° C. (180° F.) for 60 min. Drying to 3% moisture concentrated the native fruit sugars to approximately 75% sucrose equivalent, creating crunchy candy pieces with a natural, intensely sweet apple flavor made from 100% apple. The water activity was 0.30. The apple candy morsels were packaged immediately in polyester film to prevent moisture pickup from the air.

Example 2

Granular Apple Breakfast Food, 100% Apple

Three commercial apple sources: dried Granny Smith variety sour apple dices, Fuji variety sweet apple slices, and granular apple fiber, can be mixed in a ribbon blender for 2 minutes at proportions of 50%, 45% and 5%, respectively. The mix was metered into an Urschel 1700 Comitrol mill with a fine M-style cutting head, then directly into the feed section of a single screw extruder described in Example 1. The mix can be processed under the same extrusion conditions and the same drying conditions as in Example 1. The dried product exiting from the drier can be roller-milled and sifted, and the fraction falling through a U.S. #4 Standard Sieve but remaining above a U.S. #8 Standard Sieve retained for finished product packaging. The coarse particles staying on top of the #4 sieve can be recycled to the roller mill for regrinding, and the fines falling through the #8 sieve can be returned to the mixer and reprocessed. The moisture content is expected to be 5% with an Aw of 0.29. The resulting golden-brown crunchy apple granules will resemble Post® Grape-Nuts® cereal in appearance and texture, and can be served in a bowl with reduced-fat milk as part of a light, healthy breakfast. A one-ounce serving equals the apple solids in a medium-size (4-5 oz.) apple.

Example 3

Cranberry Puff-Ball Snack

Commercially available dried cranberry dices (advantageously not sugar infused) can be metered into an Urschel mill equipped with a fine M-style cutting head and fed directly into the pre-conditioner of a single screw extruder. Simultaneously, rice flour can be added at 20% of the cranberry rate, and the two ingredients mixed in the extruder pre-conditioner and fed directly into the feed throat of a single screw extruder, with water added into the first barrel (feed section) to moisten the rice flour, creating inside the extruder a homogeneous fruit dough composed of fruit and rice flour. The extrudate can be cut into approximate spherical puffed extrudate and dried in a forced-air, continuous-tray drier at 82° C. (180° F.) for 20 min to a moisture of 5% maximum. The half-inch diameter spheres are expected to exhibit a crunchy texture having a expected density of about 14 pounds per cubic foot, and a natural light red color and sweet, tart cranberry flavor. In the finished puffed product, the fresh fruit equivalent content is expected to be about 48%.

Example 4

Blueberry Puff

Commercially available dried blueberries (advantageously not sugar infused) can be processed as in Example 3. However, they can be cut into crispy, crunchy, hard puffed sphere extrudate approximately 3/16 inch in diameter for use in bakery mixes for muffins, breads, and doughnuts in place of expensive freeze-dried blueberries or to replace artificial blueberry pellets with a real fruit product.

Example 5

Apple Sprinkle Topping

Apple grinds (90%) were mixed with rice flour and/or apple fiber (10%) to coat the apple grinds with the flour or fiber and improve their flowability and to lower the density of the finished product. The mix was processed as described in Example 1, except that the fruit exiting the drier at 5% moisture was milled and sifted through a U.S. #10 sieve. The crunchy apple granules were packaged in a closable shaker canister and sprinkled over salads, meats, ice cream, and other foods.

While the foregoing is directed to various embodiments of the present invention, other and further embodiments may be devised without departing from the basic scope thereof. Other embodiments within the scope of the claims herein will be apparent to one skilled in the art from consideration of the specification and practice of the invention as disclosed herein. For example, the high fruit content food product can be mixed or manufactured into other food products. It is intended that the specification, together with the example, be considered exemplary only, with the scope and spirit of the invention being indicated by the claims that follow.

The various methods and embodiments of the invention can be included in combination with each other to produce variations of the disclosed methods and embodiments, as would be understood by those with ordinary skill in the art, given the understanding provided herein. Also, various aspects of the embodiments could be used in conjunction with each other to accomplish the understood goals of the invention. Also, the directions such as "top," "bottom," "left," "right," "upper," "lower," and other directions and orientations are described herein for clarity in reference to the figures and are not to be limiting of the actual device or system or use of the device or system. Unless the context requires otherwise, the word "comprise" or variations such as "comprises" or "comprising", should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. Further, the order of steps can occur in a variety of sequences unless otherwise specifically limited. The various steps described herein can be combined with other steps, interlineated with the stated steps, and/or split into multiple steps. Additionally, the headings herein are for the convenience of the reader and are not intended to limit the scope of the invention.

Further, any references mentioned in the application for this patent as well as all references listed in the information disclosure originally filed with the application are hereby incorporated by reference in their entirety to the extent such may be deemed essential to support the enabling of the invention. However, to the extent statements might be considered inconsistent with the patenting of the invention, such statements are expressly not meant to be considered as made by the Applicant.

The invention claimed is:

1. A process for producing a ready-to-eat (RTE) food product, comprising:
   a. comminuting dried fruit into comminuted pieces smaller than the dried fruit prior to the comminuting;
   b. feeding the comminuted dried fruit pieces as an in-feed material into an extruder, the dried fruit pieces having a water moisture content of 13-30%, and the in-feed material comprising 75-100% dried fruit
   c. compressing the dried fruit into a fruit material to generate heat; and
   d. extruding the fruit material to a fruit extrudate.

2. The process of claim 1, further comprising expanding the fruit extrudate.

3. The process of claim 2, further comprising producing an extrudate having a lesser density than a fruit dough internal to the extruder.

4. The process of claim 1, further comprising drying the extrudate to a moisture content of less than 10%.

5. The process of claim 1, further comprising drying the extrudate to a moisture content of less than 6%.

6. The process of claim 1, further comprising drying the extrudate to a water activity (Aw) level of less than 0.55.

7. The process of claim 1, further comprising drying the extrudate to an Aw level of less than 0.4.

8. The process of claim 1, wherein the in-feed material comprises 100% dried fruit.

9. The process of claim 1, wherein a portion of the extrudate comprises fruit grinds, fruit pulp, or a combination thereof.

10. The process of claim 9, wherein a minority portion of the extrudate comprises fruit powder or a fruit puree.

11. The process of claim 1, further comprising milling the extrudate to a size, shape, or combination thereof after the extruding.

12. The process of claim 1, sifting the extrudate to allow a predetermined size of extrudate to be provided for further processing.

13. The process of claim 1, further comprising sifting the extrudate through a U.S. #4 Standard Sieve but not through a US #8 Standard Sieve.

14. The process of claim 1, further comprising sifting the extrudate passing through a U.S. #8 Standard Sieve.

15. The process of claim 1, further comprising producing a hard extrudate.

16. A process for producing a ready-to-eat (RTE) food product, comprising:
   a. obtaining an in-feed material comprising 75-100% dried fruit, the dried fruit comprising dried fruit grinds and having a moisture content of 13-30%;
   b. feeding the in-feed material into an extruder;
   c. compressing the dried fruit into a fruit material to generate heat; and
   d. extruding the fruit material to a fruit extrudate.

17. The process of claim 16, further comprising coating the in-feed material with a fruit pulp, a fruit powder, a fruit puree, or a combination thereof.

18. The process of claim 17, further comprising reducing the moisture content with the coating.

19. The process of claim 16, further comprising expanding the fruit extrudate to yield a crispy, crunchy, or hard fruit extrudate.

20. The process of claim 16, further comprising producing an extrudate having a lesser density than a fruit dough internal to the extruder.

21. The process of claim 16, further comprising drying the extrudate to a moisture content of less than 10%.

22. The process of claim 16, further comprising drying the extrudate to a moisture content of less than 6%.

23. The process of claim 16, further comprising drying the extrudate to a water activity (Aw) level of less than 0.55.

24. The process of claim 16, further comprising drying the extrudate to an Aw level of less than 0.4.

25. The process of claim 16, wherein the in-feed material comprises 100% dried fruit.

* * * * *